July 24, 1956     R. J. MELTZER     2,755,707
SLIT CONTROL MECHANISM FOR OPTICAL INSTRUMENTS OR THE LIKE
Filed April 5, 1954
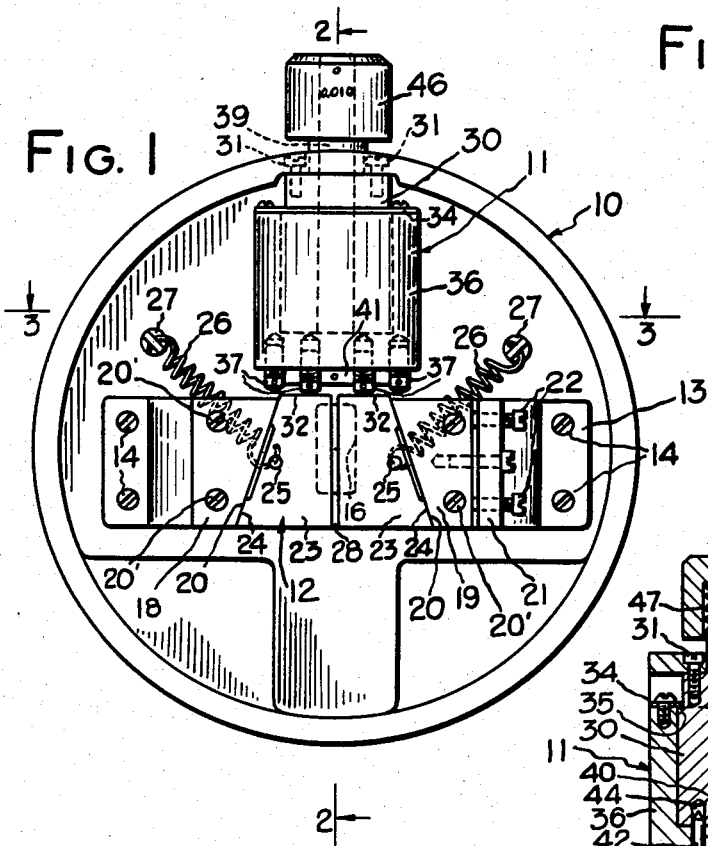
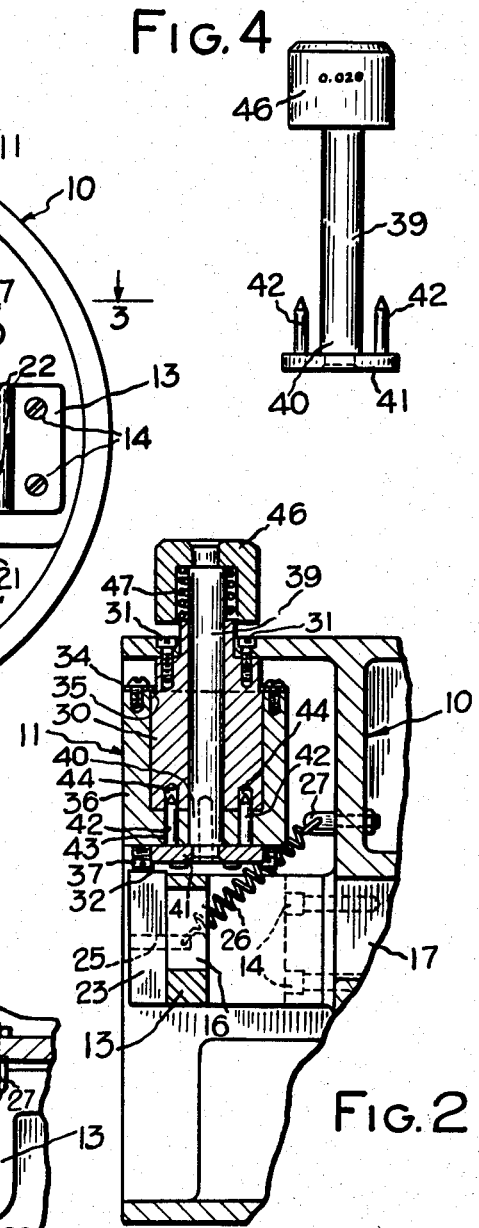
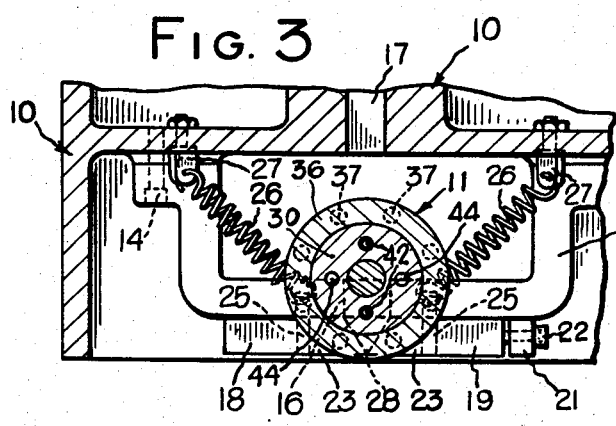
INVENTOR.
ROBERT J. MELTZER

United States Patent Office 2,755,707
Patented July 24, 1956

2,755,707

SLIT CONTROL MECHANISM FOR OPTICAL INSTRUMENTS OR THE LIKE

Robert J. Meltzer, Irondequoit, N. Y., assignor to Bausch & Lomb Optical Company, Rochester, N. Y., a corporation of New York Application April 5, 1954, Serial No. 421,014

11 Claims. (Cl. 88—61)

This invention relates to slit apparatus for use in optical instruments or the like and more particularly it has reference to an improved slit control mechanism.

In slit mechanisms now employed in monochromators, spectroscopes or the like, the width of the slit between the jaw members is varied continuously along a linear path. For instance, in some prior devices a wedged shape element is continuously driven between the movable jaws of the slit mechanism to gradually and continuously vary the width of the slit. Other slit control mechanisms employ a screw element with oppositely disposed threads on each end adapted to drive a pair of jaw members in opposite directions so that rotation of the screw opens or closes the slit in a slow continuous manner. Other prior devices use pivoting lever arrangements, spring arrangements or cam arrangements for slowly and continuously varying the size of the slit. For some purposes, it is essential that the width of the slit be varied rapidly in steps or intervals which must be repeatable for different sets of readings, with all settings of the slit width accurate to within a limited range. With the continuously driven slit mechanisms of the prior art, it is impossible to rapidly vary the slit size, it is time-consuming to slowly repeat the same sequence of settings for each set of tests and it is difficult to accurately measure the slit size for each setting so as to hold the accuracy of the slit within the required range.

It is, therefore, an object of my invention to overcome the above-noted disadvantages and to provide an improved slit control mechanism having means for varying the slit width in predetermined intervals or steps in any desired order or sequence.

It is another object of my invention to provide an improved slit control mechanism having means for rapidly changing the slit width from one predetermined width to another.

It is a further object of my invention to provide an improved slit control mechanism whereby slits of various widths may be reproduced with a relatively high degree of accuracy.

These and other objects and advantages reside in certain novel features of construction, arrangement and combination of parts as will hereinafter be more fully described and pointed out in the appended claims.

Referring to the drawings:

Fig. 1 is a front view of a bilateral slit control apparatus embodying my invention.

Fig. 2 is a sectional view taken on the line 2—2 in Fig. 1.

Fig. 3 is a sectional view taken on the line 3—3 in Fig. 1.

Fig. 4 is a front view of the actuating element of the apparatus.

A preferred embodiment of my invention is disclosed in the drawings wherein there is shown a bilateral slit control mechanism comprising a base or housing 10 normally attached to a spectroscope, or a monochromator or the like and having actuating means 11 operatively connected to a bilateral slit device 12.

The bilateral slit device 12 comprises a frame member 13 which is fastened by screws 14 to the base 10 and has a rectangular opening 16 in alignement with a similarly sized opening 17 in the base 10. Fastened on the front of said frame member 13, on opposite sides of the opening 16, is a pair of blocks 18, 19 having inclined ways 20 sloping upwardly toward each other. The block 18 is fixed on the frame 13 by the screws 20' and the block 19 is adjustably fastened on the frame 13 by screws 20' passing through oversize holes in the block 19. Threaded in the lug 21, carried by frame 13, are the three screws 22 which have their ends contacting the edge of block 19. Movably mounted between said blocks 18, 19 is a pair of jaw members 23 having inclined portions 24 positioned respectively for sliding engagement with the inclined ways 20. Attached to each jaw member 23 by a rearwardly projecting lug 25 is a spiral spring 26 which extends diagonally across the frame and into attachment with a stud 27 on the base 10. The upward diagonal pulls exerted by the pair of springs 26 on the respective jaw members 23 cause the latter to slide upwardly along the inclined ways towards each other. By limiting the movement of the jaw members 23 towards each other, a parallel sided bilateral slit 28 may be formed between the adjacent edges of the jaw members. By means of screws 22, the block 19 may be laterally adjusted for centering the bilateral slit with respect to the openings 16 and 17 and adjusting the jaws to insure parallelism.

The actuating means 11 comprises a tubular hub 30 rigidly mounted by screws 31 on a portion of said base 10 in overlying proximity to the top edges 32 of the respective jaw members 23. Encasing a lower portion of said hub 30 and mounted thereon by means of a flange 34 fitting over a shoulder 35 on said hub, so as to rotate about the axis of said hub, is a drum member 36 having a plurality of pairs of projecting stops 37 threaded into the lower face of the drum at the periphery thereof and extending downwardly therefrom. The stops 37 are axially adjustable relative to the drum 30 so that each pair may be adjusted to project a preselected distance below the lower face of said drum. The stops 37 are arranged around the face of drum 30 in such a way that a selected pair of stops may be brought into engagement, respectively, with the top edge 32 of the two jaw members for a purpose to be hereinafter more fully described.

Slidably and rotatably mounted in the tubular hub 30 is the actuating shaft 39. On the lower end 40 of the shaft 39 there is secured a flat disc 41 which bears against the lower end of drum 36 and is positioned within the peripherally arranged stops 37 carried by the lower face of drum 36. The disc 41 has a peripheral portion overlying the top edges 32 of the jaw members 23 so that downward movement of shaft 39 will produce a relatively wide separation of the jaw members 23 for a purpose to be described hereinafter. Projecting upwardly from and secured to disc 41 is a pair of spaced pins 42 which normally extend through aligned apertures 43, formed in the lower part of drum 36, and into two of a group of four apertures 44 formed in the lower face of hub 30. Secured to the upper end of shaft 39 is a recessed knob 46 which confines a compression spring 47 acting upon the top of hub 30 so as to normally urge the shaft 39 upwardly and thereby hold the pins 42 in the aligned apertures 43 and 44.

From the foregoing, it will be apparent that by moving the shaft 39 downwardly, against the action of spring 47, a peripheral portion of disc 41 will contact the upper edges 32 of jaw members 23 and force the jaw members downwardly against the action of the springs 26 so that the jaw members 23 are moved out of contact with the stops 37. The downward movement of shaft 39 and disc 41 is such that the pins 42 will be moved out of the apertures 44 but not out of the apertures 43 in the drum 36. Hence, with the pins 42 in such a partially withdrawn relation and with jaw members 23 moved out of engagement with the stops 37, the drum 36 may be rotated by turning shaft 39 by means of knob 46. The apertures 44 are so spaced that when the pins 42 are in any two of the apertures, a pair of stops 37 will be in contact, respectively, with the top edges 32 of jaw members 23. Since each pair of stops 37 has a different length, it is therefore possible to selectively vary the width of the slit between the jaw members 23 by depressing the shaft 39 and turning the drum 36 so as to position over the jaw members 23 the pair of stops 37 which will give the desired slit width.

In the construction shown in the drawing, there are four pairs of stops 37 carried by the drum 36 and four apertures 44 are formed in hub 30 so that four different slit widths may thereby be provided. In one such embodiment of the invention, the stops 37 are so adjusted that there are provided, for example, slits having widths of 0.010 mm., 0.020 mm., 0.050 mm. and 1.000 mm., respectively. If desired, the calibrations showing the various slit widths may be engraved on the knob 46. With apparatus of the type disclosed, it is possible to selectively reproduce slit widths which are accurate to ±0.0005 mm. In operation when it is desired to change the width of the slit, the knob 46, shaft 39 and disc 41 are pushed downward so that the overlying peripheral portion of said disc 41 will engage the edges 32 of the jaw members 23 and move the jaw members 23 downwardly out of contact with stops 37 and against the action of the springs 26 thereby producing a relatively large separation of the parallel edges forming the slit 28. The downward movement of the disc 41 also moves the pins 42 out of the apertures 44 in the tubular hub 30 but does not move the pins entirely out of apertures 43 formed in the drum 36. Hence, when the knob 46 is rotated about its axis, the shaft 39, disc 41, pins 42 and drum 36 are rotated with it until another pair of stops 37 is located over the jaws 23. Upon releasing the knob 46, the spring 47 forces the shaft 39, disc 41 and pins 42 upwardly so as to engage the pins in another pair of openings 44 in hub 30. At the same time, the peripheral portion of the disc 41 is disengaged from the jaws 23 so that the springs 26 force said jaws to slide up the ways 24 until the top edges 32 of the jaws 23 engage with the new pair of stops 37 for holding the adjacent edge portions of the jaws spaced apart a selected predetermined width. By adjusting the lengths of stops 37, slits of various selected widths can be provided in steps or intervals in any desired sequence. Rapid change from one slit width to another can be effected by repeating the foregoing procedure. When it is stated in the specification and claims that the slit width may be varied in "steps," it is to be understood that such steps or intervals may or may not be uniform in amount or be progressive in occurrence.

While I have shown and described a construction in which a plurality of stops 37 are mounted on a rotatable drum for selective movement into operative position with respect to the jaw members, it is, of course, obvious that the stops could be selectively moved into position by other means such as a sliding plate, for example. My novel structure also embodies means for protecting the jaws from injury which might be caused by snapping them together under the action of the springs 26. While the stop means 37 are shown as a plurality of pairs of screws, it is apparent that the stop means could be otherwise constructed. Thus, for example, a single stop member could be used providing it was large enough to span the distance between the slit and contact the top edges of both jaw members. Although my invention is shown as applied to jaw members which are slidably mounted, it could also be applied to jaw members which are pivotally mounted. The invention may, of course, also be applied to control a unilateral slit in which one jaw member is fixed and one is movable. Stops of different lengths could be carried by a movable jaw member and arranged so that the stop means would be contacted by a movable member in order to selectively vary the width of the slit.

From the foregoing, it is apparent that I am able to attain the objects of my invention and provide improved means for rapidly varying the width of a bilateral slit in predetermined steps. Using my improved slit control mechanism, the width of a slit can be varied in predetermined steps to within a very limited allowable range. Various modifications can obviously be made without departing from the spirit of my invention as pointed out in the appended claims.

I claim:

1. A slit apparatus for optical instruments comprising a base, a pair of jaw members carried by the base and respectively having adjacent straight edges between which a slit is formed, at least one of said jaw members being movably mounted for movement relative to the other jaw member for producing slits of different widths between the jaw members, means normally urging the movable jaw member towards the other jaw member, means for selectively limiting the movement of the movable jaw member to provide in steps slits of predetermined width comprising a movable member mounted adjacent the movable jaw member, a plurality of stop means of different effective lengths carried by one of the two last-named members, the other of the two last-named members having a part which is in contact with only one of said stop means for limiting the movement of the movable jaw member, and means for moving the movable member for selectively aligning different stop means with said part whereby slits of different widths may be selectively formed between the jaw members.

2. A slit unit for optical instruments comprising a base, a pair of jaw members carried by the base and respectively having adjacent straight edges between which a slit is formed, at least one of the jaw members being movably mounted for movement towards and away from the other jaw member, means normally urging the movable jaw member towards the other jaw member, means for limiting the movement of the movable jaw member to provide in steps slits of different predetermined widths comprising a movable member mounted adjacent to the movable jaw member, a plurality of stop means of different effective lengths carried by the movable member and constructed and arranged to be selectively moved into operative engagement with the movable jaw member to limit the movement thereof, and means for moving the movable member whereby slits of different widths may be selectively provided between the jaw members.

3. In a slit control mechanism the combination of a base, a pair of jaw members movably supported by the base, means normally urging said jaw members towards each other, means for limiting the movement of said jaw members to provide slits of predetermined widths therebetween, said last-named means comprising a movable member, a plurality of stop means of different lengths carried by said movable member and adapted by movement of the member to be selectively and operatively connected to the jaw members to selectively limit the movement of the jaw members to provide a plurality of slits of predetermined widths in steps.

4. In a slit control mechanism the combination of a base, a pair of jaw members movably supported by the base, means normally urging said jaw members towards each other, means for limiting the movement of said jaw members to provide slits of predetermined widths therebetween, said last-named means comprising a movable member, a plurality of stop means of different lengths carried by the movable member, and means for moving said movable member for selectively positioning different stop means in engagement with said jaw members for limiting the movement of the jaw members to provide in steps slits of different widths.

5. In a slit control mechanism the combination of a base, a pair of jaw members movably supported by the base, means normally urging said jaw members towards each other, means for limiting the movement of said jaw members to provide slits of predetermined widths therebetween, said last-named means comprising a movable member, a plurality of stop means of different lengths carried by the member and adapted to be selectively positioned in engaging relation with the jaw members to selectively limit the movement of the jaw members for providing slits of predetermined widths, means for disengaging selected stop means from the jaw members during movement of the movable member and means for moving said movable member for positioning different stop means in engagement with said jaw members whereby the width of the slit may be varied in predetermined steps.

6. In a slit control mechanism the combination of a base, a pair of jaw members movably supported by the base, means normally urging said jaw members towards each other, means for limiting the movement of the jaw members to provide slits of predetermined widths therebetween, said last-named means comprising a tubular hub rigidly mounted on the base in overlying relation to said jaw members, a drum member encasing one end of said hub and mounted to rotate about the vertical axis of said hub, a plurality of stop means of different lengths mounted around the periphery of the lower face of the drum member and extending parallel to the axis of said hub, means for moving said drum member and stop means about the axis of the hub for positioning selected stop means in alignment with the jaw members whereby the latter will contact the stop means for limiting the movement of the jaw members whereby the slit may be varied in predetermined steps.

7. In a slit control mechanism the combination of a base, a pair of spaced blocks mounted on said base and having inclined ways sloping upwardly toward each other, a pair of jaw members forming a slit between adjacent parallel edge portions thereof, said jaw members having inclined portions respectively mounted for sliding movement on said inclined ways, a pair of springs respectively urging the jaw members along the inclined ways towards each other, means for varying the width of the slit in predetermined steps comprising a tubular hub rigidly mounted on said base in overlying relation to said jaw members, a drum member encasing a lower portion of said hub and mounted to rotate about the axis of said hub, a plurality of pairs of stops projecting downwardly from the periphery of the lower face of said drum for selectively engaging with said jaw members for holding said jaw members spaced apart to form slits of predetermined widths, an actuating shaft slidably and rotatably mounted in said tubular hub, a disc mounted on the lower end of said shaft and having a portion overlying portions of the jaw members, a pair of positioning pins upwardly projecting from the disc, yieldable means normally urging said shaft and disc upwardly whereby the pins pass through apertures formed in the drum and into selected apertures in the lower portion of the hub whereby depressing the shaft will engage the overlying portion of the disc with the jaw members to move and hold them a substantial distance apart while the stops are selectively positioned above the jaw members by turning the drum.

8. In a slit control mechanism the combination of a base, a pair of jaw members movably supported by the base, means normally urging said jaw members towards each other, means for limiting the movement of the jaw members to selectively provide slits of different predetermined widths therebetween, said last-named means comprising a plurality of stop means adapted to be selectively positioned in engaging relation with the jaw members to selectively limit the movement of the jaw members to provide a plurality of slits of predetermined widths, a drum member supporting said stop means around the periphery of its end portion and having apertures therein, a tubular hub rigidly mounted on the base for rotatably supporting said drum member and stop members in overlying relation to said jaw members, said hub having apertures in its under side, an actuating shaft slidably and rotatably mounted in said hub, a disc fixed on the lower end of said shaft and having a portion overlying portions of said jaw members, positioning pins on the upper side of said disc, and spring means normally urging said shaft and disc upwardly to position the pins in the aligned apertures in the drum and hub whereby downward movement of the shaft and disc engages the overlying portion of said disc with the jaw members for further spreading the jaw members and disengaging the positioning pins from the hub so that the disc and drum can be rotated about the axis of the hub and shaft to align selected stop means with the jaw members whereupon releasing the shaft will disengage the disc from the jaw members and permit the selected stop means to set the new slit width.

9. In a slit control mechanism the combination of a base, a pair of jaw members movably supported by the base, yieldable means normally urging said jaw members towards each other, means for limiting the movement of the jaw members to provide slits of predetermined widths therebetween, said last-named means comprising a tubular hub rigidly mounted on the housing in overlying relation to said jaw members, a drum member encasing one end of said hub and mounted to rotate about the axis of said hub, a plurality of stop means of different lengths mounted around the periphery of the lower face of the drum member and extending parallel to the axis of said hub, said stop means being adapted to be selectively positioned in engaging relation with the jaw members to provide a plurality of slits of predetermined widths, an actuating shaft slidably and rotatably mounted on the hub and coaxial therewith, a disc fixed on the lower end of said shaft and having a portion overlying portions of said jaw members, and means on said disc coacting with means on said drum member for permitting said disc to be moved axially relative to and rotated with said drum whereby downward movement of the shaft engages the overlying portion of the disc with the jaw members for respectively disengaging the stop means from the jaw members and opening the slit so that the disc, drum member, and stop members can be rotated for positioning newly selected stop means relative to the jaw members for varying the widths of the slit in steps.

10. In a slit control mechanism the combination of a base, a pair of jaw members carried by the base and respectively having adjacent straight edges between which a slit is formed, at least one of the jaw members being movably mounted for movement toward and away from the other jaw member, means normally urging the movable jaw member towards the other jaw member, means for limiting the movement of the movable jaw member to provide in steps slits of predetermined widths comprising a movable member operatively connected to the movable jaw member whereby movement of the movable member will move the jaw member, and a plurality of stop means operatively connected to the movable member for controlling the movement of the jaw member in steps whereby the jaw member may be selectively moved to provide slits of predetermined widths between the jaw members.

11. A slit apparatus for optical instruments comprising a base, a pair of jaw members carried by the base and respectively having adjacent straight edges between which a slit is formed, at least one of said jaw members having a laterally disposed part and being mounted for movement relative to the other jaw member for producing slits of different widths between the jaw members, means normally urging the movable jaw member towards the other jaw member, means for selectively limiting the movement of the movable jaw member to provide in steps slits of predetermined widths comprising a movable member having a part lying in a plane substantially perpendicular to a plane parallel to the straight edges of the jaw members and being mounted adjacent the laterally disposed part of the movable jaw member, a plurality of stop means of different effective lengths carried by one of said parts and extending towards the other of said parts, the other of said parts being in contact with only one of said stop means for limiting the movement of the movable jaw member, and means for moving the movable member whereby different stop means may be selectively brought into contact with the last-named part to provide slits of different widths between the jaw members.

References Cited in the file of this patent

UNITED STATES PATENTS

| | | |
|---|---|---|
| 937,156 | Kroedel | Oct. 19, 1909 |
| 2,485,089 | Fassin | Oct. 18, 1949 |